(12) United States Patent
Antonio (10) Patent No.: US 9,636,577 B2
(45) Date of Patent: May 2, 2017

(54) TRIGGER ATTACHMENT AND METHOD FOR VIDEOGAME CONTROLLERS

(71) Applicant: T Antonio, Rochester, NH (US)

(72) Inventor: T Antonio, Rochester, NH (US)

( * ) Notice: Subject to any disclaimer, the term of this patent is extended or adjusted under 35 U.S.C. 154(b) by 0 days.

(21) Appl. No.: 15/212,457

(22) Filed: Jul. 18, 2016

(65) Prior Publication Data
US 2016/0325177 A1    Nov. 10, 2016

Related U.S. Application Data

(63) Continuation-in-part of application No. 14/953,570, filed on Nov. 30, 2015, now Pat. No. 9,409,088.

(60) Provisional application No. 62/085,638, filed on Nov. 30, 2014.

(51) Int. Cl.
*A63F 13/24*    (2014.01)
*A63F 13/98*    (2014.01)

(52) U.S. Cl.
CPC .............. *A63F 13/24* (2014.09); *A63F 13/98* (2014.09)

(58) Field of Classification Search
CPC .......... A63F 13/02; A63F 13/08; A63F 13/20; A63F 13/24; A63F 13/90; A63F 2300/1018; A63F 2300/1043; A63F 13/23; A63F 13/98; F41B 7/00; F41B 9/00; F41B 11/00
See application file for complete search history.

(56) References Cited

U.S. PATENT DOCUMENTS

| | | | | |
|---|---|---|---|---|
| 9,174,134 | B1 * | 11/2015 | Grant | A63F 13/98 |
| 9,504,911 | B2 * | 11/2016 | Hackney | A63F 13/24 |
| 2012/0322555 | A1 * | 12/2012 | Burgess | A63F 13/06 463/37 |
| 2016/0144275 | A1 * | 5/2016 | Hackney | A63F 13/24 463/37 |
| 2016/0193529 | A1 * | 7/2016 | Burgess | A63F 13/20 463/37 |
| 2016/0256772 | A1 * | 9/2016 | Kissoon | A63F 13/24 |

\* cited by examiner

*Primary Examiner* — Lawrence Galka
(74) *Attorney, Agent, or Firm* — Ross K. Krutsinger; Mesmer & Deleault PLLC (57) ABSTRACT

A trigger attachment for a game controller having a housing, a trigger extending through the housing with an exposed contact surface and operable through a trigger range of motion between a zero position and an end position, and an additional button spaced from the trigger by a housing spacer. The trigger attachment has an attachment body defining a recess with a receiving face shaped to mate with the finger contact surface of the trigger, a sloped outer front surface, an upper surface, and a lower housing contact surface. The attachment body is sized and shaped to be mounted on the trigger with the trigger's receiving face against the finger contact surface. When mounted on the trigger, the lower housing contact surface is positioned to abut the housing when the trigger is pressed to reduce the trigger range of motion by preventing the trigger from fully achieving the end position.

7 Claims, 10 Drawing Sheets

TRIGGER ATTACHMENT AND METHOD FOR VIDEOGAME CONTROLLERS

FIELD OF THE DISCLOSURE

The disclosure relates to enhancements to triggers of videogame controllers used to play video games. More particularly, the disclosure relates to a trigger attachment and method for reducing trigger range of motion in videogame controllers.

BACKGROUND

Videogame controllers have become ubiquitous with contemporary versions of the hand-held controller being offered in a wide variety of multiple-trigger configurations. Several makes of videogame controllers have left and right trigger buttons positioned to be actuated by the user's index fingers when the controller is held by the user with two hands. Each trigger button has a predefined range of travel from the starting or zero position to the fully-depressed position. In games where trigger actuation is a binary function, the actuation point is generally about half way between the zero position and the fully-depressed position. Binary trigger button function is common in games where the trigger button controls shooting, jumping, or other movement. In such games, each manipulation of the trigger results in one shot, one jump, one turn, or other function operable on a yes/no basis.

In other games where the trigger produces an analog signal, the trigger button output signal changes based on the degree to which the trigger button is pressed. Such an analog response is used in games where the trigger button controls a throttle or other variable input device.

In games where rapid firing, jumping, running, or other action is required that are based on binary control from the trigger button, the gamer repeatedly presses the trigger in rapid succession. With ever-increasing computer power, the speed at which functions can be processed has also increased to the point where the gamer's speed in manipulating the trigger button is a limiting factor rather than the game's processing speed. Regardless of the controller configuration, users often fully press the trigger to its end point to implement binary control functions even though depression of about 50% would send the desired signal. However, since pressing the trigger to just past 50% in a fast and controlled manner is very difficult to do without a defined stopping point, the user very often fully presses the trigger despite not needing to do so.

Trigger buttons available on several popular videogame controllers have a range of motion that exceeds what is needed to cause the trigger button to signal a response in the game. Therefore, by eliminating or reducing unnecessary movement in the trigger before or after the point of signal, the gamer can speed up or economize trigger movement to improve game performance.

Figure 1A:
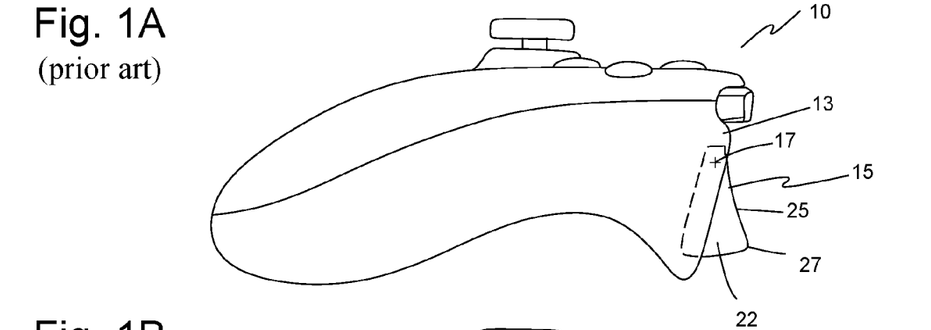
FIG. 1A is a side view of a controller of the prior art showing the trigger in the zero position.
Figures 1B, 2A:
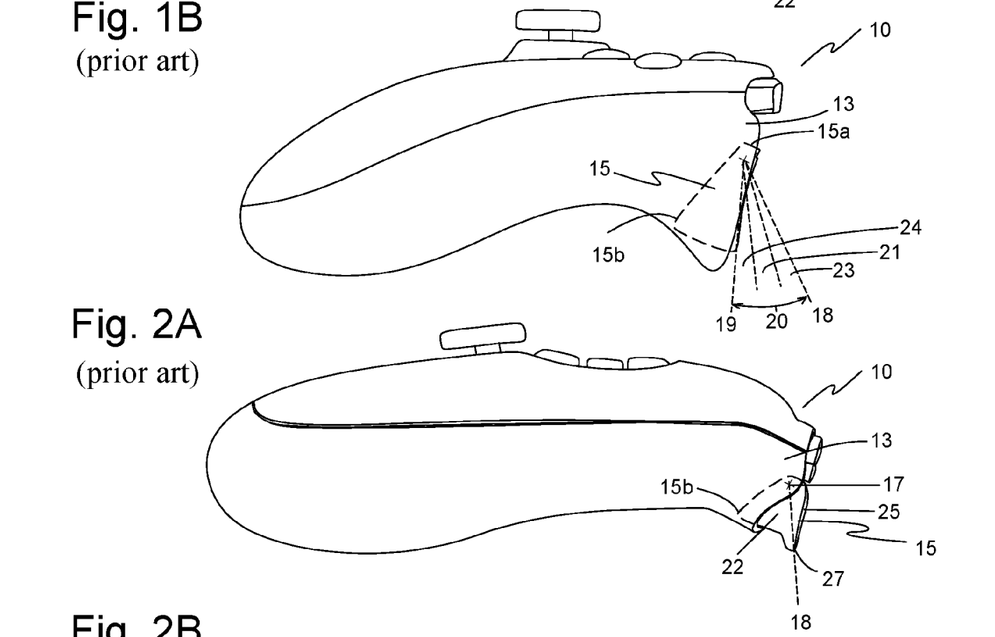
FIG. 1B is a side view of the controller of FIG. 1A showing the trigger in the end position.
FIG. 2A is a side view of another embodiment of a controller of the prior art showing the trigger in the zero position.
Figure 2B:
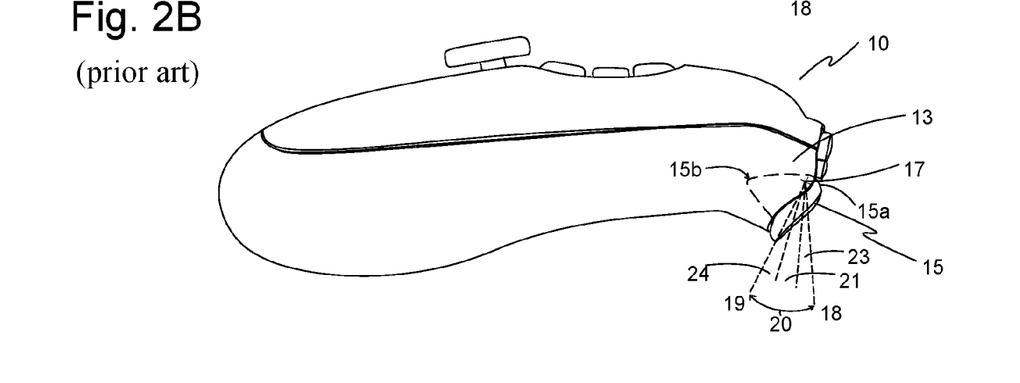
FIG. 2B is a side view of the controller of FIG. 2A showing the trigger in the end position.

Referring to FIGS. 1A and 1B, a side view illustrates one embodiment of a known videogame controller 10 having a controller housing 13 and a trigger 15. Trigger 15 pivots about a pivot point 17 between a zero position 18 (shown in FIG. 1A) and a fully-depressed position or end position 19 (shown in FIG. 1B). A trigger range of motion 20 is defined as the travel of trigger 15 between the zero position 18 and the end position 19. Within trigger range of motion 20 is an active zone 21 in which commands are initiated and carried out. FIGS. 2A and 2B illustrate a side view of another embodiment of a known controller 10, also having housing 13, and trigger 15 that pivots between zero position 18 (shown in FIGS. 2A & 2B) and end position 19 (shown in FIG. 2B) to define the trigger range of motion 20. The take-up 23 of trigger 15 is the range of motion between zero position 18 and active zone 21. The over travel 24 of trigger 15 is the range of motion between active zone 21 and end position 19.

In some controllers, 10 trigger 15 abuts housing 13 to define zero position 18 and/or end position 19; in other controllers 10, zero position 18 and end position 19 are defined by other structures (not shown) within housing 13. Each trigger 15 of FIGS. 1-2 has a trigger body 22 that extends partially from housing 13, a finger contact surface 25 intended for contact with the user's finger (not shown), and a trigger tip 27.

At least one attempt to address the trigger travel is disclosed in U.S. Pat. No. 8,480,491 (Jul. 9, 2013 to Burgess et al.). The '491 patent is directed to a game controller having an adjustable trigger system for calibration or customized control of trigger action. The trigger has a strike plate coupled to a trigger body. Two adjustment screws extend through the controller housing to contact portions of the strike plate. By adjusting the screw positions, the trigger's range of travel is adjusted due to changing the point at which the screws make contact with the strike plate.

Burgess et al. also address trigger travel in a game controller in published PCT application no. WO 2015/004261 titled Games controller and Trigger Therefor. The '261 publication discloses a game controller having a controller housing, a trigger body, a trigger housing, and a detent housing with at least one detent. The detent housing is rotationally mounted in the trigger body and is rotatable between a first position in which the detent is in a stowed condition and a second position in which the detent is in a deployed condition. When the detent is in deployed condition, the detent engages the controller housing to stop movement of the trigger body and limit the trigger movement.

Burgess et al. further address trigger range of motion in a game controller in published PCT application no. WO 2015/078994. The '994 publication discloses a game controller including an adjustable trigger system with a mechanism to allow the end user to control or recalibrate the maximum and/or minimum trigger positions. When the trigger is pressed in typical game controllers, the trigger travels first through a "dead zone" where no commands are initiated. As the triggers is further depressed, it passes through an active region in which a command action is initiated and carried out. As the trigger is still further depressed beyond the active region, the trigger travels through an over travel zone to the trigger end stop during which no further commands are initiated.

The '994 published PCT application addresses the problem of excessive trigger travel by modifying the internal structure of a trigger in a game controller to reduce the amount of "dead zone" at the beginning of the trigger pull and the "over travel" zone at the end of the trigger pull. The trigger body includes a limb extending back towards the housing. A front edge on the base housing defines an end stop to limit movement of the trigger. An arm is connected to a base plate in the controller housing and extends between the rear edge of the limb and the base housing. The front edge of the arm has an adjustable position and defines the end point of trigger travel. A control screw extends through the arm to a variable extent. As the control screw is advanced, the end of the screw comes into contact with the upper surface of the limb as the trigger pivots towards the start position. Thus, by adjusting the control screw, the trigger can be prevented from returning fully to the start position. By also adjusting the position of the arm, the end point of the trigger travel can also be altered.

SUMMARY

In the prior art approaches to trigger action discussed above, the trigger assembly is modified to include screws, detents, or other features that the user may advance, retract, or adjust to change the stop points of the trigger and therefore the trigger range of motion. As in the '261 published PCT application, the trigger button is modified to include an adjustable detent that also changes the stop point of trigger travel. These approaches to optimizing trigger travel require purchasing a controller already equipped with these features or modifying existing controller features.

Purchasing new controllers is expensive and not all game systems may offer the modified trigger. Further, since price is a key consideration in a purchasing decision, the added cost of the modified trigger likely deters a purchase except for the most enthusiastic gamers. Therefore, the commercial viability of such a controller is questionable.

Modifying existing controllers requires that the controller be manufactured in a way that permits the user to access to the trigger assembly within the housing and also configured to accommodate such structural changes. Also, the user must have the skill, tools, and desire to perform the modification. Further, making adjustments to the trigger action can be time consuming, difficult to get right, and difficult to reproduce when returning the trigger action to a desired state after making changes for another game.

A further limitation of the approaches of Burgess et al. is that the trigger adjustments and modifications are particular to one controller. As such, the gamer's modified controller must be brought to the location where games are being played. More likely, the inconvenience of modifying the controller would result in the need to own several controllers each customized to a particular game.

Therefore what is needed is a different solution to the problem of excess trigger range of motion. The present invention is directed to a trigger attachment that can be installed on existing controller triggers to modulate the trigger range of motion without the need for any modification to the structure of the trigger itself. When installed on a stock trigger as supplied by the manufacturer, trigger attachments of the present invention continue to permit the trigger to initiate and carry out the desired commands in the game being played while also reducing excess trigger range of motion.

One aspect of the present invention is directed to a trigger attachment for a game controller to modulate the trigger range of motion. Embodiments of the trigger attachment reduce the trigger range of motion by making contact with the controller housing as the trigger is pulled and/or when the trigger is released from a depressed position. Trigger attachments installed on the trigger reduce the pre-travel (often called "take-up") of the trigger to shorten the range of motion needed to activate the trigger function. With the trigger attachment installed, the trigger is prevented from returning fully to the zero position. Therefore, the trigger is closer to the actuation point compared to position of the trigger when it returns fully to the zero position as supplied by the controller manufacturer. The pre-travel is the distance the trigger button travels at the beginning of actuation before the trigger button reaches the activation point. Trigger attachments installed on the trigger alternately or additionally reduce the trigger over travel beyond the active zone. By making contact with the controller housing, the trigger attachment prevents the trigger from being pressed to the end of the full trigger range of motion. Trigger attachments of the present invention reduce the trigger range of motion, but permit cycles of activation and deactivation so as not to compromise trigger function.

In one aspect of the invention, a trigger attachment is for use with a game controller having a housing, a trigger extending through the housing with a finger contact surface and operable through a trigger range of motion between a zero position and an end position. In one embodiment the trigger attachment has an attachment body defining a recess with a receiving face shaped to mate with the finger contact surface of the trigger, a sloped outer front surface, and a lower housing contact surface. The attachment body is sized and shaped to be mounted on the trigger with the trigger partially received in the recess and the receiving face against the finger contact surface of the trigger. When mounted on the trigger, the lower housing contact surface is positioned to abut the housing when the trigger is pressed, thereby reducing the trigger range of motion by preventing the trigger from fully achieving the end position.

In another embodiment, the attachment body further defines an upper housing contact surface shaped and configured to reduce a take-up portion of the trigger range of motion by contacting the housing and preventing the trigger from returning fully to the zero position.

In another embodiment, the trigger attachment attaches to the trigger using a friction fit. In another embodiment, the attachment body defines at least one catch and the friction fit includes the catch(es) engaging a void or catch surface on the trigger. In another embodiment, the friction fit includes the attachment body engaging the finger contact surface and sides of the trigger.

In another embodiment, the trigger attachment also includes an upper catch and a lower catch to retain the trigger attachment on the trigger. For example, the upper catch extends from the trigger body and is configured engage a top trigger surface. The lower catch extends from the trigger body and is positioned to engage a lower trigger surface.

In some embodiments, an adhesive is used to secure the trigger attachment to the trigger. For example, adhesive is disposed on the receiving face of the trigger attachment.

In another embodiment, the trigger attachment includes a mounting bracket sized to be mounted on the finger contact surface of the trigger. The mounting bracket defines at least one bracket catch surface. The attachment body mates with the mounting bracket and engages the bracket catch surface(s) to removably retain the attachment body on the mounting bracket and therefore on the trigger. In some embodiments, the attachment body engages the mounting bracket with a snap fit. In other embodiments, attachment body slidingly engages the mounting bracket.

In another embodiment, the mounting bracket or the trigger attachment includes a magnet and the other of the trigger attachment and the mounting bracket includes a ferromagnetic material. Magnetic attraction between the magnet and the ferromagnetic material is sufficient to retain the trigger attachment coupled to the trigger during normal use of the controller.

In another embodiment, the trigger attachment includes a wedge member that can be inserted between a top surface of the trigger and the housing. The wedge member prevents the trigger from returning fully to the zero position. The wedge member "pre-primes" the trigger for quicker activation by reducing the take-up portion of the trigger range of motion, yet without compromising the cyclical activate-deactivate function of the trigger.

In another embodiment, the sloped outer front surface is concavely curved down along and forward from the trigger to engage a user finger. This curvature increases the leverage of the user finger to actuate the trigger when the finger engages the trigger attachment. For example, the concave shape of the sloped outer front surface is contoured to the shape of a human finger to provide enhanced tactile feel and to provide an enhanced resting surface for the finger when the trigger is not being activated.

In another embodiment, a trigger attachment is for use with a game controller having a housing, a trigger extending through the housing with a finger contact surface and operable through a trigger range of motion between a zero position and an end position, and a button extending through the housing above the trigger and spaced from the trigger by a housing spacer. The trigger attachment has an attachment body defining a recess with a receiving face shaped to mate with the finger contact surface of the trigger, a sloped outer front surface, a lower housing contact surface, and an upper contact surface extending transversely from a top margin of the sloped outer front surface at least 2.5 mm toward a lower margin of the housing spacer. In other embodiments, the top margin extends at least 3 mm or at least 4 mm from the top margin of the sloped outer front surface. The upper contact surface provides an alternate surface to the sloped outer front surface for a user to press the trigger. The attachment body is sized and shaped to be mounted on the trigger with the trigger partially received in the recess with the finger contact surface of the trigger against the receiving face of the attachment body.

In one embodiment, the upper contact surface slopes upward from the upper margin of the sloped outer front surface to the lower margin of the housing spacer. In another embodiment, the upper contact surface curves upward from the upper margin of the sloped outer front surface to the lower margin of the housing spacer. In some embodiments, the upper contact surface has a radius of curvature from 3 mm to 8 mm.

Another aspect of the invention is directed to a method of reducing trigger range of motion in a video game controller. In one embodiment, the method includes the steps of providing a video game controller having a housing, a trigger extending through the housing with a finger contact surface and operable through a trigger range of motion between a zero position and an end position; providing a trigger attachment having an attachment body defining a recess with a receiving face shaped to mate with the finger contact surface of the trigger, an sloped outer front surface, and a lower housing contact surface; mounting the trigger attachment on the trigger with the trigger partially received in the recess and the receiving face against the finger contact surface of the trigger; and positioning the lower housing contact surface to abut the housing when the trigger is pressed, thereby reducing the trigger range of motion by preventing the trigger from fully achieving the end position.

In another embodiment of the method, the step of mounting the trigger attachment on the trigger includes applying an adhesive between the trigger attachment and the trigger.

In another embodiment of the method, the step of mounting the trigger attachment on the trigger includes providing a mounting bracket, securing the mounting bracket to the contact surface of the trigger, and installing the trigger attachment on the trigger by mating engagement with the mounting bracket.

In one embodiment of the method, the step of mounting the trigger attachment on the trigger includes inserting the trigger partially into the recess, positioning the receiving face to abut the finger contact surface of the trigger, and engaging a catch on the trigger body with a catch surface on the trigger.

In another embodiment, the method also includes providing a wedge member capable of insertion between the trigger and the housing and securing the wedge member to the trigger. The wedge member prevents the trigger from returning fully to the zero position. The wedge member may be part of the trigger attachment or a component separate from the trigger attachment body.

DETAILED DESCRIPTION

Figures 3, 4, 5:
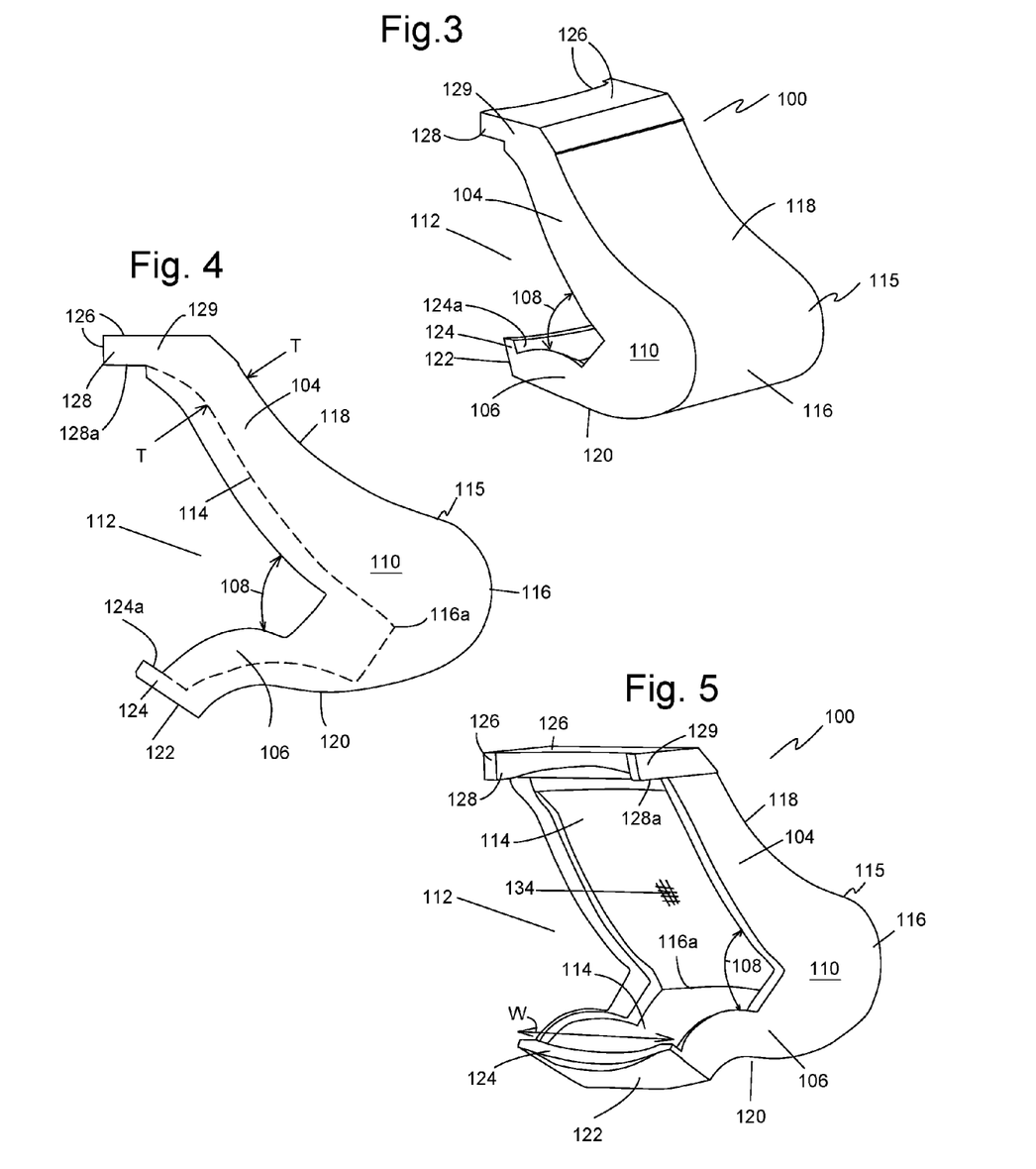
FIG. 3 is a front and side perspective view of an embodiment of a trigger attachment of the present invention.
FIG. 4 is a side elevational view of the trigger attachment of FIG. 3.
FIG. 5 is a side and rear perspective view of the trigger attachment of FIG. 3 showing the recess.

Embodiments of the present invention are illustrated in FIGS. 3-21. Referring to FIGS. 3-5, a left and front perspective view, a side view, and a right and rear perspective view, respectively, illustrate one embodiment of a trigger attachment 100. Trigger attachment 100 has an attachment body 110 sized and shaped to be mounted on a trigger 15. Attachment body 110 has an upper limb 104 and a lower limb 106 that each extend from an attachment tip 116. In doing so, attachment body 110 defines a rear-facing (i.e., away from tip 116) recess 112 sized and shaped to mate with trigger 15 of a controller 10. Upper limb 104 and lower limb 106 define recess 112 with an acute angle 108 to receive trigger tip 27 therein with an inside surface or receiving face 114 of recess 112 abutting finger contact surface 25 of trigger 15. In some embodiments, attachment body 110 is retained on trigger 15 by frictional engagement or interference fit with trigger 15. To facilitate the frictional engagement, some embodiments of trigger attachment 100 are made of resilient materials, such as silicone rubber, foam, or the like. Attachment body also defines an outside surface 115 that extends along a sloped outer front surface 118, around attachment tip 116, and along a bottom surface 120.

In some embodiments as shown in FIG. 4, a thickness T of attachment body 110 from receiving face 114 to outside surface 115 is non-uniform. For example, thickness T is greater towards attachment tip 116. Optionally, sloped outer front surface 118 forms a concave slope as it extends towards attachment tip 116 and has a convex cross section as it extends laterally from edge to edge. These features result in a contoured trigger attachment 100 that provides increased trigger surface area. One benefit of such a contour is that the resting position of a finger on the sloped outer front surface 118 is ergonomic and comfortable. Additionally, the user's finger is held in place on sloped outer front surface 118 with little effort. Such a contour also provides a greater surface area and therefore an increased directional range of finger movement that provides quicker activation of trigger 15. Pressure from the user's finger in a direction generally perpendicular to any one of various locations on sloped outer front surface 118 results in movement of the trigger 15 through the take-up 23 and towards the active zone 21. Additionally, the curved contour of trigger attachment 100 is aesthetically pleasing.

Lower limb 106 extends to terminate at a lower housing contact surface 122 generally facing in a rearward direction or away from attachment tip 116. When trigger tip 27 is received in recess 112, lower housing contact surface 120 is positioned to abut controller housing 13 to restrict trigger movement when the trigger is activated. As such, lower housing contact surface 120 reduces the trigger range of motion 20. More particularly, lower housing contact surface 120 is positioned to reduce over travel 24 of trigger 15 beyond the active zone 21 by stopping trigger 15 prior to reaching end position 19.

Optionally, upper limb 104 extends to define an upper housing contact surface 126 that is positioned to contact controller housing 113 when trigger 15 returns towards the zero position 18. By restricting movement of trigger 15 as it pivots towards zero position 18, upper housing contact surface 126 reduces take-up 23 or "dead zone" at the beginning of a trigger pull. As a result, the take-up 23 of trigger 15 is reduced. In one embodiment, upper limb 104 wedges between trigger 15 and housing 13 when trigger 15 returns towards zero position 18, where upper housing contact surface 126 is a top surface that contacts housing 13. Thus, upper limb 104 acts as a wedge 129 to prevent trigger 15 from returning fully to the zero position 18. Other embodiments of wedge member 129 are discussed below with reference to FIG. 11.

In other embodiments, upper housing contact surface 126 is a rear-facing surface (i.e., facing away from attachment tip 116 and towards controller 10). Similar to lower housing contact surface 122, rear-facing upper housing contact surface 126 is positioned to abut controller housing 13 to reduce the trigger range of motion 20. For example, upper housing contact surface 126 abuts housing 13 as trigger returns towards the zero position, thereby restricting trigger movement and reducing the trigger range of motion 20.

In some embodiments, upper limb 104 defines an upper catch 128 with an upper catch surface 128a facing generally towards lower limb 106. Upper catch 128 is useful to engage an edge or recess along top 15a of trigger 15. When upper limb 104 extends to act as a wedge 129, upper catch 128 may engage a groove in trigger 15 to help maintain the position of wedge 129 as trigger 15 pivots.

In some embodiments, lower limb 106 additionally defines a lower catch 124 to engage a rear edge 15b (shown in FIG. 1B), catch surface, or other feature defined on some embodiments of trigger 15. Lower catch 124 has a lower catch surface 124a that faces generally towards upper limb 104. Lower catch 124 extends fully or partially across the width W of trigger attachment 100. In some embodiments, lower catch 124 is a narrow tab or extension from lower limb 106 that is sized to engage the edge or catch surface on trigger 15. For example, lower catch 124 is a relatively narrow strip of material with lower catch surface 124a that extends into housing 13 to hook a rear edge of trigger 15, where lower catch 124 does not interfere with actuation of trigger 15. By extending along the bottom surface of trigger 15, lower catch 124 in some embodiments helps align trigger attachment 100 on trigger 15.

Trigger attachment 100 prevents movement of trigger 15 through the full trigger range of motion 20 by contacting housing 13 of controller 10 to reduce take-up 23 and/or over travel 24. Trigger attachment 100 is dimensioned to reduce the range of trigger travel 20 while permitting the user to execute the intended function of the trigger 15 without excessive movement outside of the active zone 21. Embodiments of trigger attachment 100 are dimensioned to define various corresponding trigger ranges of motion 20 that accommodate a wide variety of videogame controllers 10 and active zones 21 of different sizes. For example, lower limb 106 in some embodiments of trigger attachment 100 extends rearwardly in different amounts. The length of lower limb 106 from inside surface 116a of attachment tip 116 defines the point within trigger range of motion 20 where lower housing contact surface 122 makes contact with housing 13. Thus, for example, the user may own several sets of trigger attachments 100 where each set is sized for short, medium, or long trigger range of motion 20. When switching between games that require different trigger ranges of motion 20, the user then may switch trigger attachments 100 as needed to provide the appropriate range of motion 20.

In some embodiments, upper limb 104 is configured to include a wedge 129 that fits between housing 13 and trigger 15. Wedge 129 may be part of upper limb 104 that defines upper housing contact surface 126. Alternately, wedge 129 is distinct and separate from attachment body 110. In such an embodiment, wedge 129 may be secured permanently or temporarily to trigger top 15a with adhesives, mechanical fasteners, snap-lock features, or the like. Wedge 129 reduces take-up 23 without diminishing the ability of trigger 15 to initiate and carry out commands. As with lower housing contact surface 122, wedge 129 or upper housing contact surface 126 may be dimensioned to reduce take-up 23 in various amounts to accommodate different trigger designs of different controllers 10. In some embodiments, wedge 129 is part of upper limb 104 and includes upper catch 128 and upper housing contact surface 126 as different faces of wedge 129.

Referring to FIG. 5, some embodiments of trigger attachment 100 include optional adhesive 134 disposed on all or part of receiving face 114 for the purpose of fixing trigger attachment 100 to trigger 15. Adhesive 134 binds trigger attachment 100 to trigger 15 with sufficient strength to endure many repeated cycles of user manipulation. In some embodiments, the user applies adhesive 134 to trigger attachment 100 just prior to installation on trigger 15. In other embodiments, trigger attachment 100 includes adhesive 134 already disposed and including a lift-off backing (not shown) that the user removes just prior to installing trigger attachment 100 on trigger 15. In some embodiments, adhesive 134 is a pressure-sensitive adhesive that is activated when the user applies sufficient pressure. Other variations on adhesive 134 known in the art are also acceptable.

Figure 6:
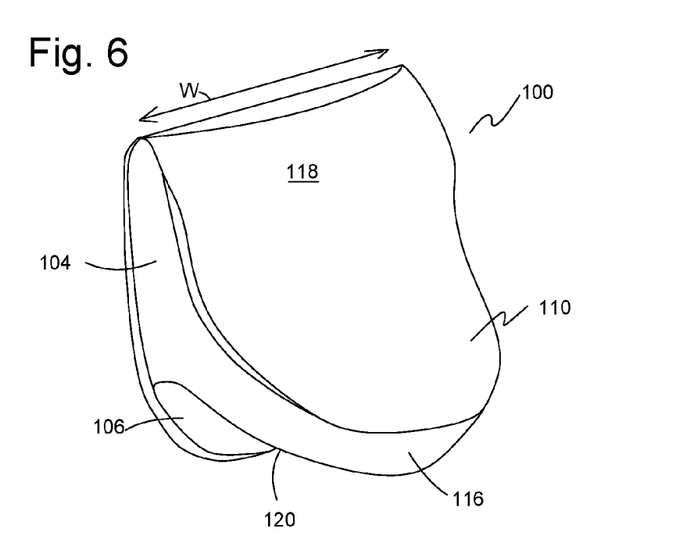
FIG. 6 is a front and side perspective view of another embodiment of a trigger attachment of the present invention.
Figure 7:
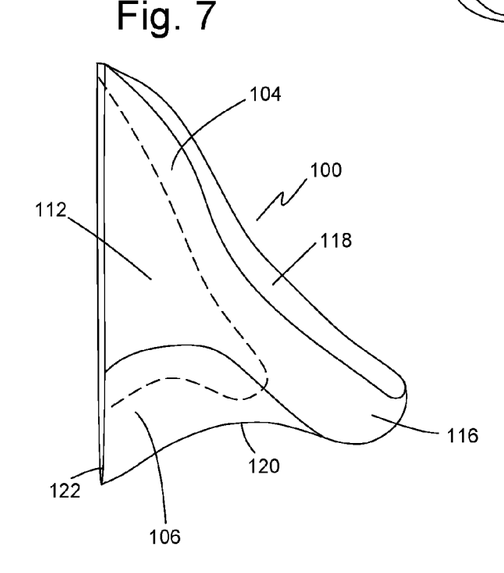
FIG. 7 is a side elevational view of the trigger attachment of FIG. 6.
Figure 8:
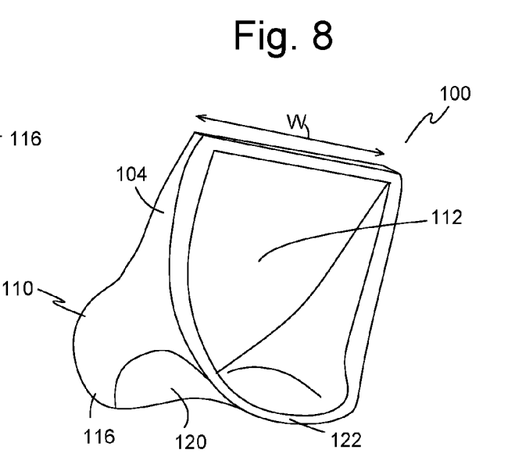
FIG. 8 is a side and rear perspective view of the trigger attachment of FIG. 6 showing the recess.

Referring now to FIGS. 6-8, a right and front perspective view, a right-side view, and a left and rear perspective view, respectively, illustrate another embodiment of trigger attachment 100 shaped for a different embodiment of trigger 15. As with the embodiment of trigger attachment 100 shown in FIGS. 3-5, the embodiment shown in FIGS. 6-8 has trigger body 110 with an upper limb 104 and lower limb 106 each extending away from attachment tip 116. Trigger attachment 100 defines recess 112 shaped to receive and mate with trigger 15. As shown in FIGS. 6-8, lower housing contact surface 122 faces rearwardly away from attachment tip 116 and is positioned to contact housing 13 when trigger 15 is pressed by the user. Sloped outer front surface 118 forms a concave slope as it extends towards attachment tip 116 and has a domed or convex cross section across the width W of trigger attachment 100. Bottom surface 120 is concave to prevent interference with the user's other fingers when pressing trigger 15.

Figure 9:
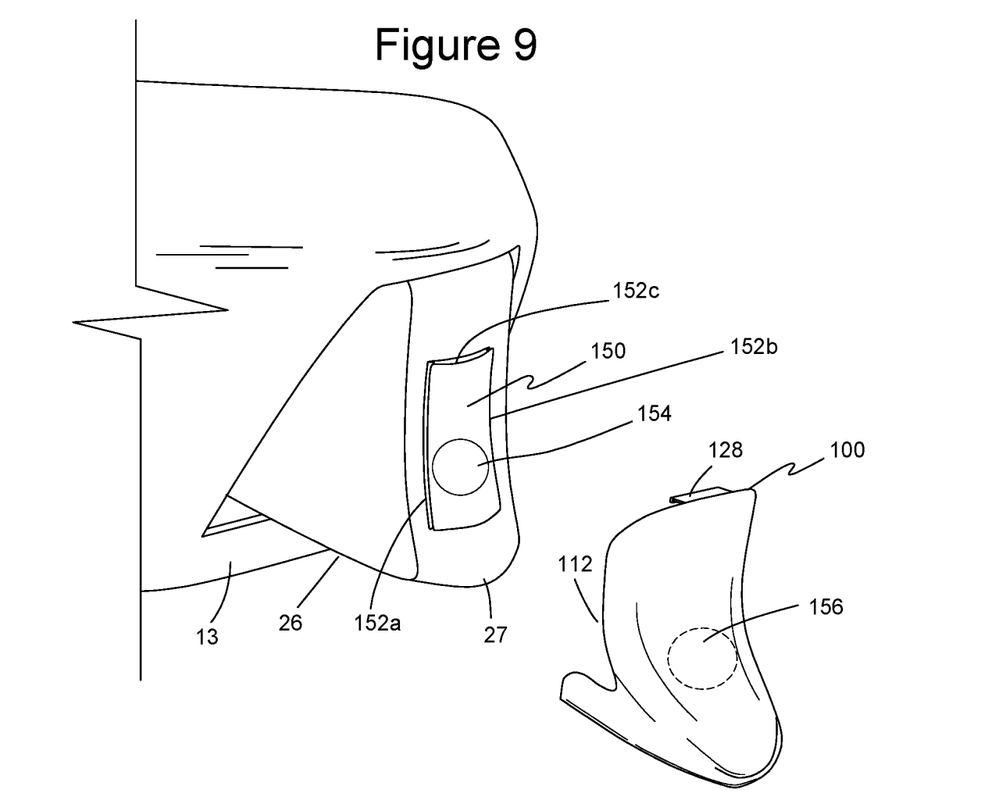
FIG. 9 is a front and side perspective view of part of a controller and one embodiment of a trigger attachment positioned for installation using an attachment bracket on the trigger.

Referring now to FIG. 9, some embodiments of trigger attachment 100 include a mounting bracket 150. Mounting bracket 150 is used to attach trigger attachment 100 to trigger 15. In one embodiment, mounting bracket 150 is secured to finger contact surface 25 of trigger 15 by adhesive. In one embodiment, mounting bracket 150 is shaped with overhanging or rounded outer bracket edges 152a, 152b. Receiving face 114 of attachment body 110 has corresponding mating features that mate with and engage outer bracket edges 152a, 152b in sliding engagement, snap fit, or other engagement to hold attachment body 110 to mounting bracket 150, and therefore to trigger 15. Mating bracket 150 facilitates attachment body 110 being releasably attached to trigger 15 and use of interchangeable trigger attachments 100. In some embodiments, upper catch 128 engages upper bracket edge 152c. Since trigger tip 27 is received in recess 112, attachment body 110 may be stretched or deformed slightly during installation so that upper catch 128 will reach to upper bracket edge 152c. Thus, when attachment body 110 attempts to resume a relaxed state, upper catch 128 may be at tension while gripping upper bracket edge 152c and therefore releasably lock attachment body 110 to trigger 15.

In some embodiments, one or more locking tab is formed on the either the trigger body 110 or mounting bracket 150 to engage the other component so as to releasably lock the two components together. For example, tabs with a catch surface similar to upper catch 128 as shown in FIG. 9 are disposed along attachment body 110 to engage outer bracket edges 152a, 152b. The snap-fit between trigger body 110 and mounting bracket 150 provide one method to secure trigger attachment 110 to trigger 15. Mounting bracket 150 may alternately be installed on other faces of trigger 15, such as a bottom face 26, where lower catch 124 (shown in FIG. 5) engages mounting bracket 150.

In some embodiments, mounting bracket 150 is ferromagnetic or includes a bracket ferromagnetic member 154. In such embodiments, attachment body 110 also includes a body ferromagnetic member 156, such as a magnet, positioned to mate with bracket ferromagnetic member 154. For example, mounting bracket 150 with bracket ferromagnetic member 154 is affixed to trigger 15. Attachment body 110 is then mounted to mounting bracket 150, which includes body ferromagnetic member 156, such as steel. Attachment body 110 is therefore retained on trigger 15 using magnetic attraction between the ferromagnetic members 154, 156, but may be removed by the user as desired. The magnetic force generated by the ferromagnetic members 154, 156 is sufficient to permit use of the trigger attachment 100 without the decoupling from trigger 15 during normal operation and including contact between trigger attachment 110 and housing 13.

Figure 10:
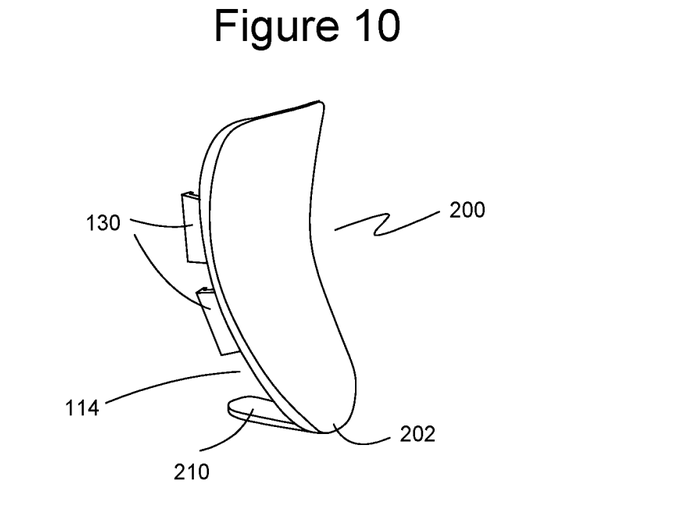
FIG. 10 is a front and side perspective view of another embodiment of a trigger attachment referred to as a trigger cover.

Referring now to FIG. 10, a front perspective view illustrates an embodiment of a trigger cover 200. Trigger cover 200 attaches to mounting bracket 150 (shown in FIG. 9) with a sliding motion in which corresponding features (e.g., mating rails) on the two elements create a releasable, but secure connection. In one embodiment, for example, trigger cover includes one or more catches 130 along its edges or disposed on receiving face 114 to engage mounting bracket 150. Trigger cover lacks lower housing contact surface 122 and upper housing contact surface 126 (shown in FIG. 5). Accordingly, trigger cover 200 may be interchanged with trigger attachment 100 to allow full trigger range of motion 20. Thus, when used with mounting bracket 150, trigger cover 200 provides an option to achieve full trigger range of motion 20 without removing mounting bracket 150 from trigger 15. Being interchangeable with trigger attachment 100, trigger cover 200 is desirable when playing videogames that do not benefit from, or are inhibited by, reduced trigger range of motion 20. In some videogames, only the left or right trigger may benefit from reduced trigger range of motion. In this scenario the trigger cover 200 may be used on just the left or right trigger 15 to create a matching aesthetic and reach while only limiting the movement of either the right or left controller trigger 15. Additionally, the trigger cover 200 may provide added surface area for resting as well as additional directions in which to exert force on trigger 15 to cause trigger 15 to initiate a signal.

Optionally, trigger cover 200 or trigger attachment 100 includes an alignment/locking tab 210. In combination with upper catch 128 on trigger attachment 100 or with catches 130 on trigger cover 200, alignment/locking tab mechanically, but releasably locks trigger cover 200/trigger attachment 100 to trigger 15 to ensure successful depression and return of trigger 15 towards zero position 18. Alignment/locking tab 210 extends rearwardly from lower limb 106 of trigger attachment 100 or from lower end 202 of trigger cover 200. Alignment/locking tab 210 enters housing 13 to align and stabilize trigger attachment 100/cover 200. When the trigger 15 is pressed by the user, trigger attachment 100/cover 200 is under the most stress and most subject to release from trigger 15. Alignment/locking tab 210 stabilizes trigger attachment 100/cover 200 and prevents its removal from trigger 15 during game play. In general, alignment/locking tab 210 is made of a strip of material sufficiently thin to pass between trigger 15 and housing 13 without interfering with the trigger movement. In some embodiments, alignment/locking tab 210 is made of a resilient material that can be stretched to engage rear edge 15a of trigger 15 and pull trigger attachment 100 towards trigger tip 27.

The trigger limiter embodiments disclosed herein may be formed from a wide variety of materials including plastics, metals, and metal alloys.

Referring now to FIGS. 11 A-11E, and with continued reference to FIGS. 1-2, an embodiment of trigger 15 is shown in various positions with and without trigger attachment 100. The position of rear edge 15b in each figure can be used to identify the difference in the position of trigger 15 between zero position 18 and end position 19. FIGS. 11A and 11B illustrate side views of trigger 15 with a section of housing 13 and without trigger attachment 100. FIG. 11A illustrates trigger 15 in its normal resting state biased to the zero position 18. Contact surface 25 has a trigger radius of curvature 15c and a contact surface length 25a from trigger top 15a to trigger tip 27. FIG. 11B illustrates trigger 15 in its fully depressed state or end position 19.

Figure 11A:
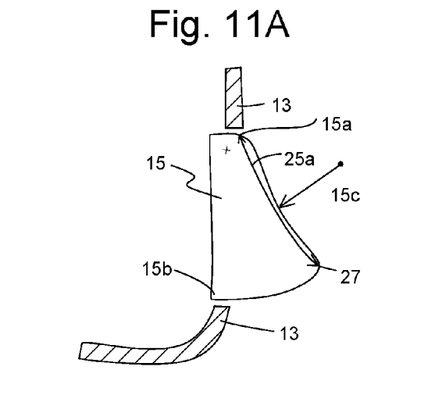
FIGS. 11A-11E are side elevational views of a trigger and section of a controller housing showing the various ranges of motions of the trigger with and without a trigger attachment.
Figure 11B:
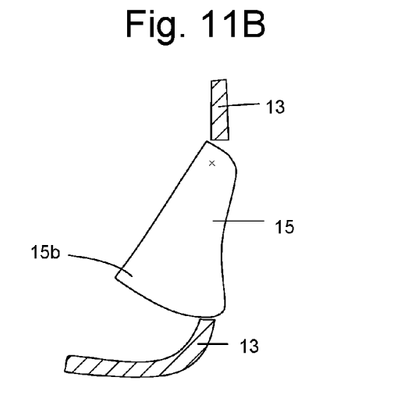
Figure 11C:
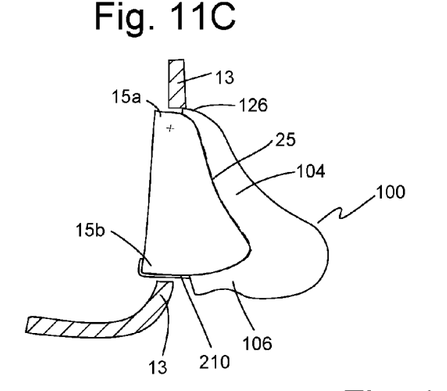
Figure 11D:
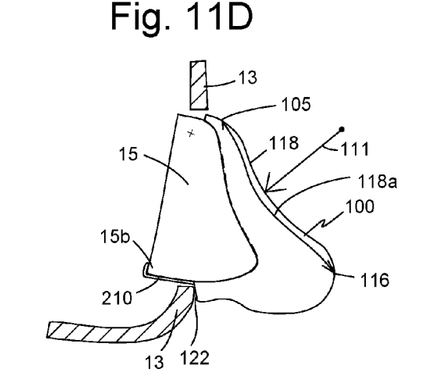

FIGS. 11C and 11D show trigger 15 with trigger attachment 100 installed on trigger 15. As shown in FIG. 11C, upper limb 104 extends along finger contact surface 25 and extending to occupy the space between top 15a of trigger 15 and housing 13. Upper housing contact surface 126 engages housing 13 to restrict trigger 15 from returning fully to the zero position 18 shown in FIG. 11A, thereby reducing take-up 23 (shown in FIGS. 1B.) FIG. 11D illustrates trigger 15 pivoted towards end point 19, but is prevented from fully reaching that position due to lower housing contact surface 122 contacting housing 13. FIG. 11D illustrates how trigger attachment 100 reduces the over travel 24 (shown in FIG. 1B) of trigger 15. Also shown in both of FIGS. 11C and 11D, trigger attachment 100 includes alignment/locking tab 210, which extends from lower limb 106 into housing 13 to engage rear edge 15b of trigger 15. Alignment/locking tab 210 helps retain trigger attachment 100 on trigger 15.

FIG. 11D also illustrates user contact surface length 118a between upper surface 105 and attachment tip 116. User contact surface 118 also defines an attachment radius of curvature 111. Table 1 below shows length corresponding to contact surface length 25a of triggers 15 and user contact surface length 118a for trigger attachment 100. Table 1 also shows the length and radius corresponding to the trigger radius of curvature 15c or attachment radius of curvature 111.

TABLE 1

Properties of Trigger Attachment and Triggers

| | Trigger 15 for Playstation | Trigger 15 for XBox | Trigger attachment 100 |
|---|---|---|---|
| Length | 0.70" | 0.87" | 0.94" |
| Radius | 1.4" | 2.25" | 0.75" |

In some embodiments, trigger attachment 100 has a user contact surface length 118a that is greater than contact surface length 25a of a provided trigger 15. That is, trigger attachment 100 increases the contact surface length 25a. Trigger attachment 100 in some embodiments also has attachment radius of curvature 111 that is less than trigger radius of curvature 15c. In some embodiments, attachment radius of curvature 111 changes along user contact surface length 118a, where attachment radius of curvature 111 is smaller towards attachment tip 116 These features allow trigger attachment to be more comfortable for the user by more closely following the curvature around one's finger, which typically has a radius of about 0.25". Thus, the user can better "hook" trigger attachment 100 with the finger. An increased user contact surface length 118a allows enough space for trigger attachment to attain the reduced attachment radius of curvature 111. A trigger may only contact about 15% of the circumferential finger surface. In comparison, trigger attachment 100 contacts approximately 30-40% of the circumferential finger surface.

Figure 11E:
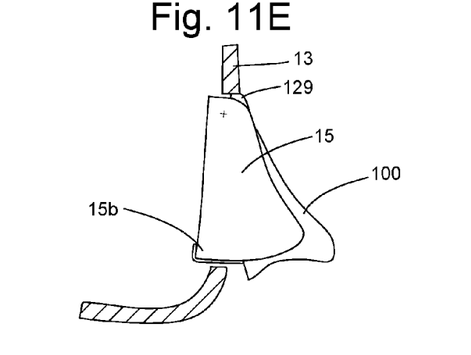

FIG. 11E illustrates trigger 15 with another embodiment of trigger attachment 100 and separate wedge 129 adhered to trigger 15. Wedge 129 fits between top 15a of trigger 15 and housing 13 to prevent trigger 15 from returning fully to the zero position 18. Thus, trigger 15 in FIG. 11E is "primed" with a reduced take-up 23 compared to trigger 15 in FIG. 11A, which lacks wedge 129.

Figure 12:
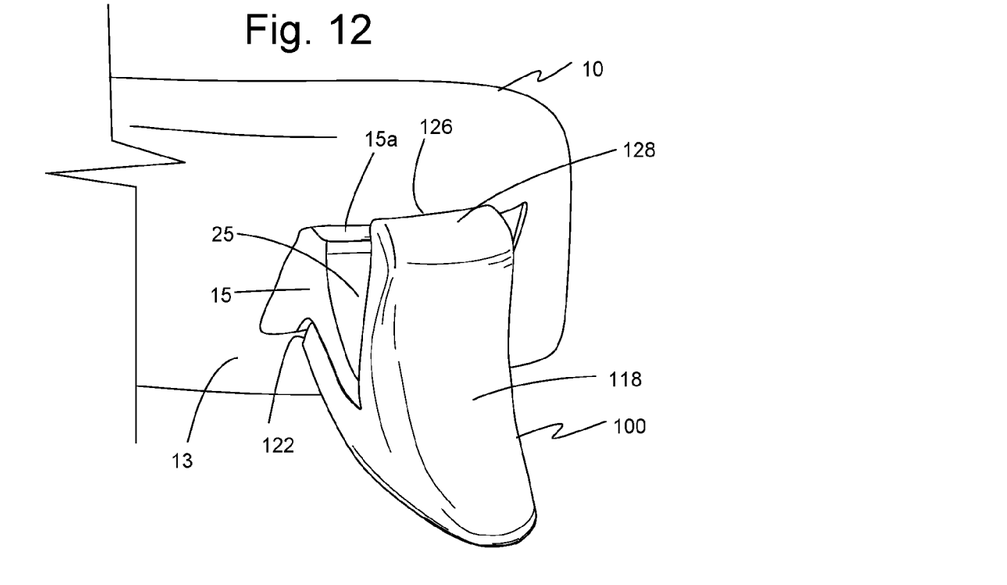
FIG. 12 is a front and side perspective view of one embodiment of a trigger attachment shown installed on a trigger.

Referring now to FIG. 12, a perspective view illustrates one embodiment of trigger attachment 100 installed on trigger 15 of a controller 10 such as a controller 10 sold under the trademark PlayStation®. Lower housing contact surface 122 is positioned to abut housing 13 when trigger 15 is pressed by the user to reduce over travel 24 (shown in FIG. 1B) of trigger 15. Upper catch 128 engages top 15a of trigger 15 to help retain trigger attachment 100 on trigger 15. Upper housing contact surface 126 races rearwardly and abuts housing 13 to reduce the take-up 23 (shown in FIG. 1B) of trigger 15. Sloped outer front surface 118 provides a comfortable grip to the user with a modified surface position compared to finger contact surface 25 of trigger 15.

Figure 13:
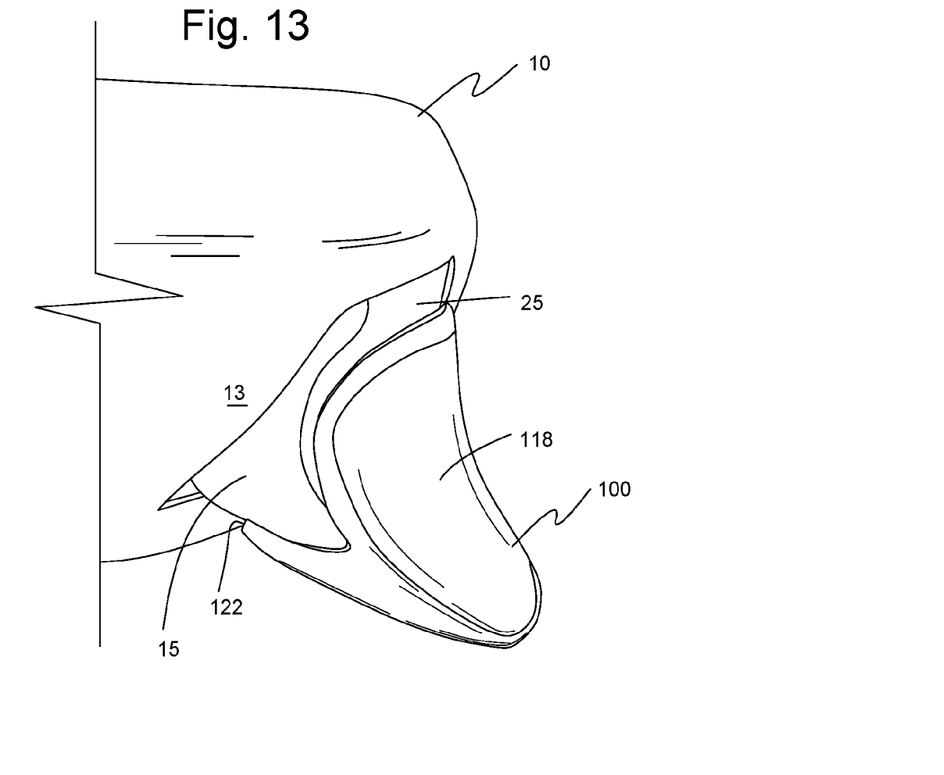
FIG. 13 is a front and side perspective view of another embodiment of a trigger attachment shown installed on a trigger.

Referring now to FIG. 13, a perspective view illustrates one embodiment of trigger attachment 100 installed on trigger 15 controller 10 such as a controller 10 sold under the trademark Xbox®. Lower housing contact surface 122 is positioned to abut housing 13 when trigger 15 is pressed by the user, thereby reducing the over travel 24 (shown in FIG. 1B) of trigger 15. Here, trigger attachment 100 does not affect the take-up 23 of trigger 15 and instead only affects over travel 24. Sloped outer front surface 118 provides a comfortable grip to the user with a modified surface position compared to finger contact surface 25 of trigger 15.

Figure 14:
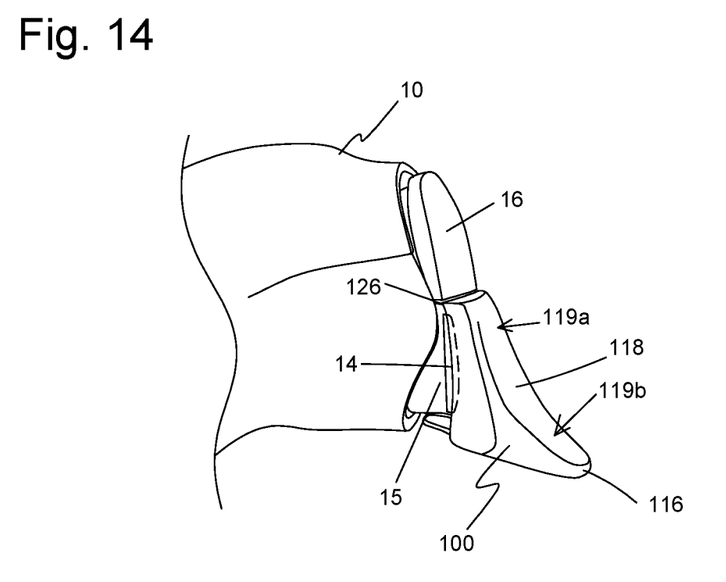
FIG. 14 is a side perspective view of the trigger attachment and controller of FIG. 14 showing a void in the side of the trigger that is engaged by the trigger attachment.

Referring now to FIG. 14, a portion of controller 10 is illustrated from a side perspective view with trigger attachment 100 installed on trigger 15. Additional button 16 is positioned above trigger 15. Trigger attachment 100 remains engaged with trigger 15 due to a snap fit with voids or recesses (not shown) in trigger 15. Sloped outer front surface 118 provides various directions of engagement indicated by arrows 119a, 119b, respectively, along which the user may apply force to trigger 15 via trigger attachment 100. For example, by positioning the user's finger 300 (shown in FIG. 15) closer to upper housing contact surface 126 (or similar position), the user may pull rearwardly to activate trigger function. In contrast, by positioning the user's finger 300 closer to attachment tip 116, the user may pull down and rearwardly to activate trigger 15. Thus, the user may find a direction of engagement 119 that best suits the user's hand size and hand placement on controller 10. When the point of contact between finger 300 and trigger 15 changes during a trigger pull, such as when the user rolls the finger 300 along trigger 15, the increased change in direction of engagement 119 on sloped outer front surface 118 compared to user contact surface 25 results in improved trigger responsiveness for the user.

Figure 15:
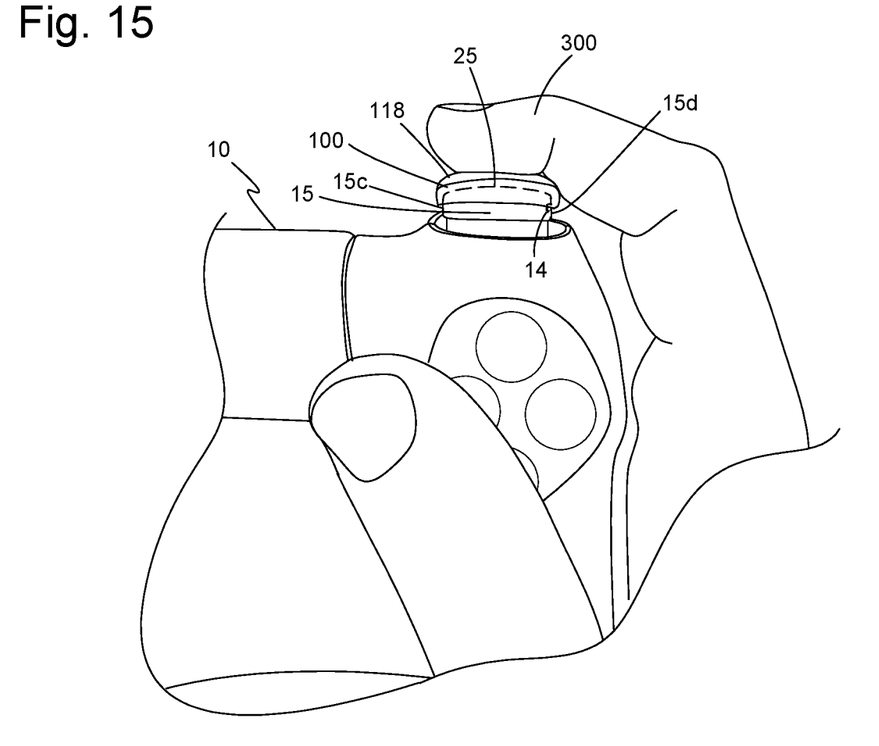
FIG. 15 is a top plan view of another embodiment of a trigger attachment shown installed on a trigger of a controller and a user's finger on the sloped outer front surface.

Referring now to FIG. 15, a top view shows a portion of controller 10 of FIG. 14, where trigger attachment 100 is installed on trigger 15. An additional button 16 (shown in FIG. 14) is omitted to more clearly see trigger attachment 100 and trigger 15. Part of trigger 15 extending into trigger attachment 100 is shown in broken lines. Trigger attachment 100 abuts contact surface 15 and wraps around trigger sides 15c, 15d. In cases where trigger 15 defines a void 14, trigger attachment 100 preferably occupies void 14 to further secure trigger attachment 100 on trigger 15. A user's finger 300 is positioned on sloped outer front surface 118 of trigger attachment 100 to actuate the trigger function.

Figure 16:
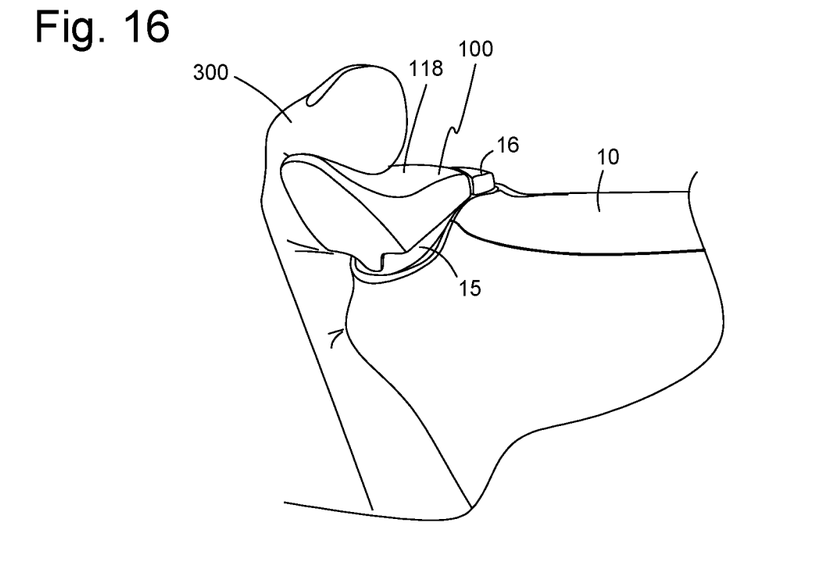
FIG. 16 is a bottom and side perspective view of the trigger attachment of FIG. 14 showing the user's finger hugged by the curvature of the sloped outer front surface of the trigger attachment.

Referring now to FIG. 16, controller 10 of FIG. 14 is shown in a bottom and side perspective view. Trigger 15 is visible behind trigger attachment 100 and below additional button 16. Due to the curvature of sloped outer front surface 118, user's finger 300 is at rest against sloped outer front surface 118 in a more ergonomic position. This ergonomic position allows for a more relaxed finger position on trigger 15.

Figure 17:
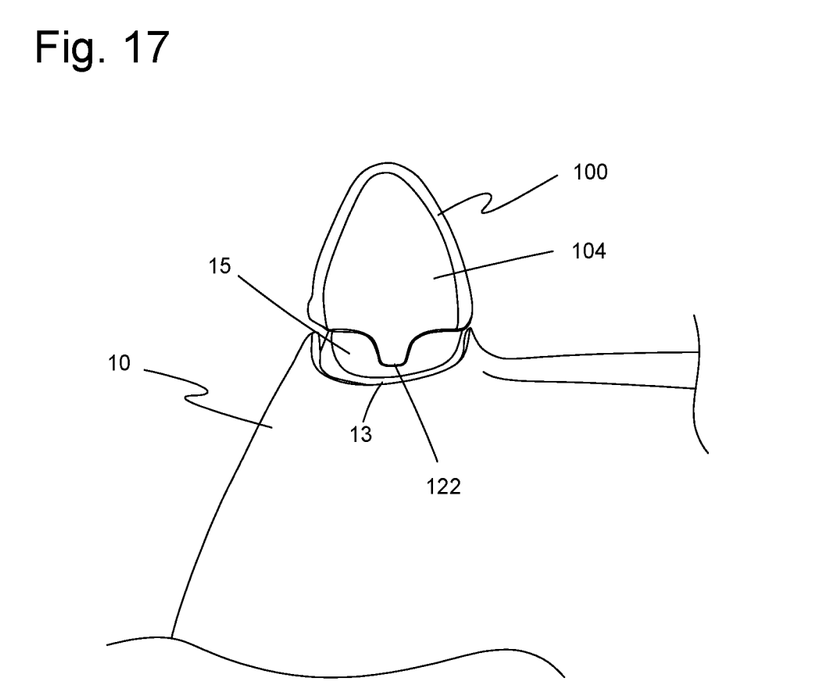
FIG. 17 is a bottom plan view of the trigger attachment of FIG. 14 showing the lower housing contact surface of the trigger attachment.

Referring now to FIG. 17, a bottom view of controller 10 of FIG. 14 shows trigger attachment 100 installed on trigger 15. Lower housing contact surface 122 extends rearwardly from lower limb 106 towards housing 13 to reduce over travel 24 of trigger 15.

Figure 18:
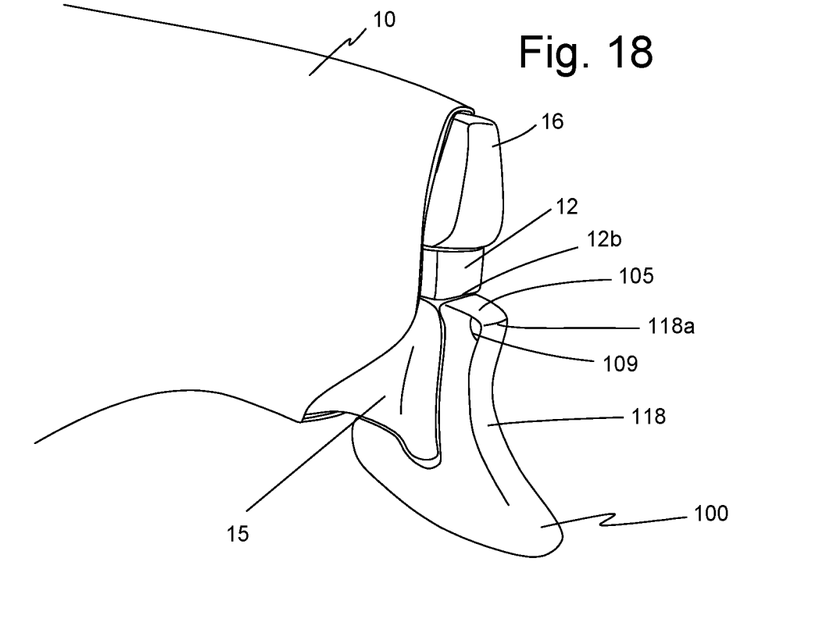
FIG. 18 is a side perspective view of another embodiment of a trigger attachment of the present invention showing a sloped upper surface.
Figure 19:
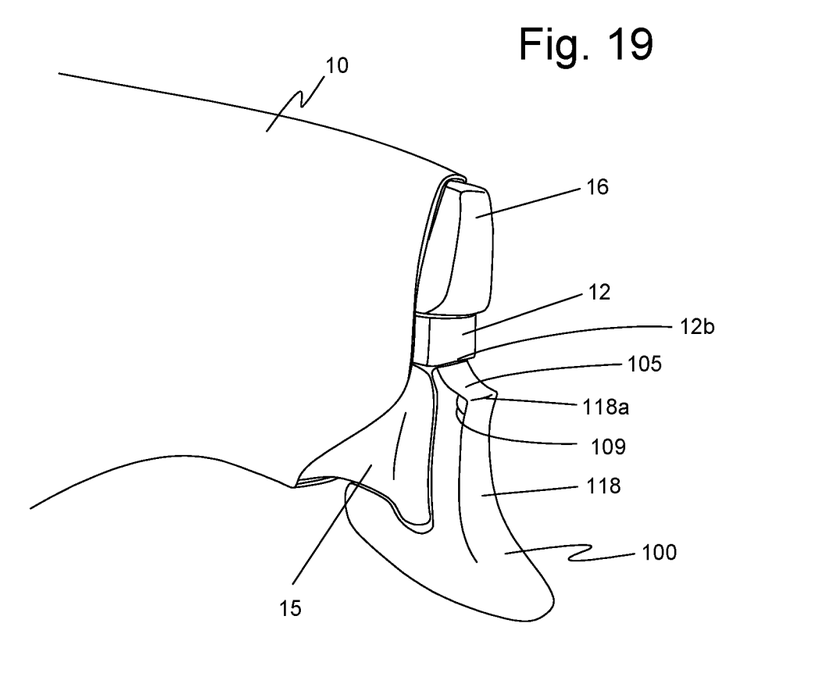
FIG. 19 is a side perspective view of another embodiment of a trigger attachment of the present invention showing a curved upper surface.

Referring now to FIGS. 18 and 19, a portion of controller 10 is illustrated from a side perspective view with additional embodiments of trigger attachment 100 installed on trigger 15. Controller 10 includes additional button 16 positioned above trigger 15 and spaced from trigger 15 by a housing spacer 12. Upper surface 105 extends transversely from a top margin 118a of sloped outer front surface 118 towards a lower margin 12a of housing spacer 12. In some embodiments, such as shown in FIG. 18, upper surface 105 is sloped and defines an angle 109 of about 90-100° from top margin 118a. Upper surface 105 extends at least 2.5 mm towards housing spacer 112. In other embodiments, upper surface 105 extends 3 mm, 4 mm or more from top margin 118a towards lower margin 12b.

In other embodiments as shown, for example, in FIG. 19, upper surface 105 is concave and curves upward from top margin 118a of sloped outer front surface 118 to lower margin 12b of housing spacer 12. In some embodiments, upper surface 105 has a radius of curvature of three mm to about eight mm, such range of radii corresponding to the typical radius curvature of a human index fingertip 302 (shown in FIGS. 20-21). When upper surface 105 is curved, angle 109 is typically obtuse, such as about 120°.

Figure 20:
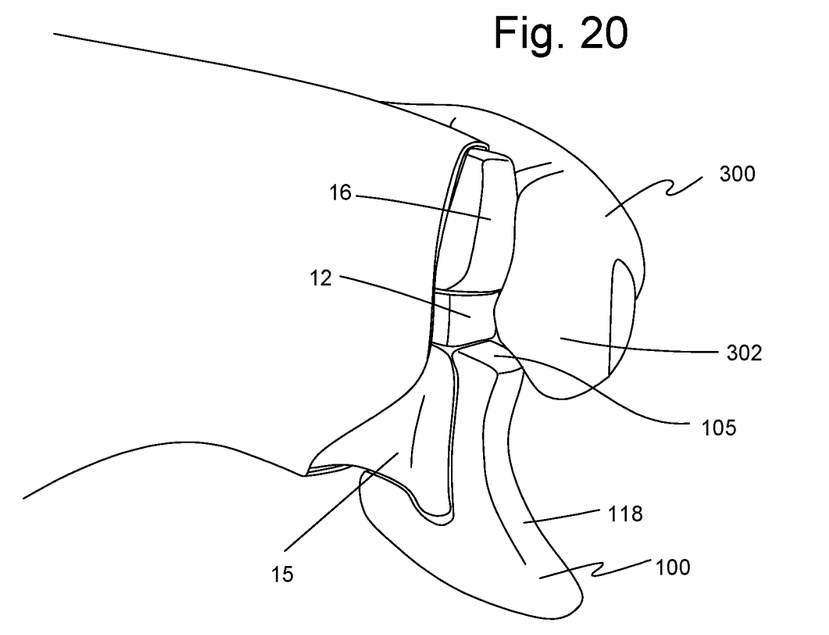
FIG. 20 is a side perspective view of the trigger attachment of FIG. 18 shown with a user's finger.
Figure 21:
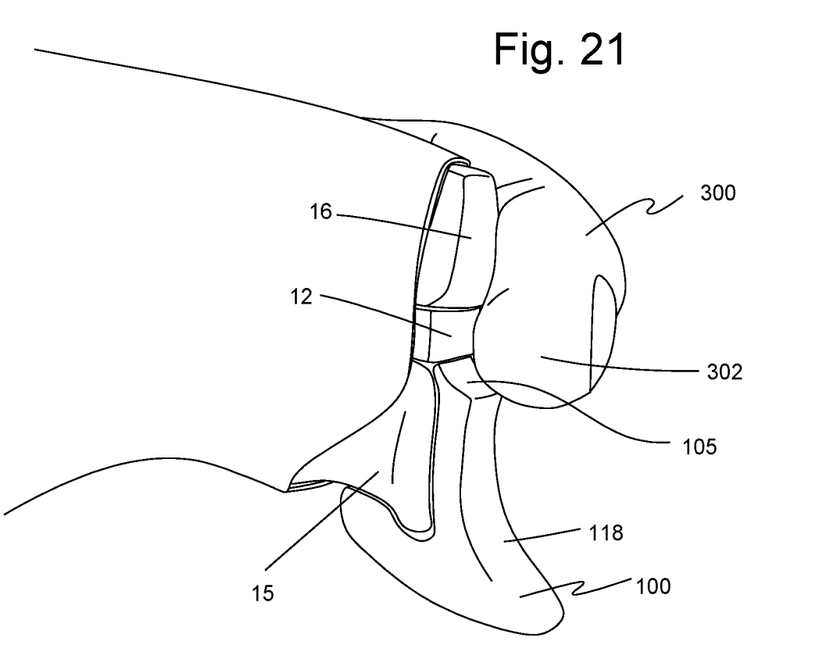
FIG. 21 is a side perspective view of the trigger attachment of FIG. 19 shown with a user's finger.

As shown in FIGS. 20-21, upper surface 105 may be used for pressing trigger 15. Upper surface 105 provides an alternative to sloped outer front surface 118 using any one of the directions of engagement 119 discussed above. In game play, for example, the user may position the finger 300 on housing spacer 12 between trigger attachment 100 and additional button 16 for rapid toggling between trigger 15 and additional button 16. In this position, applying downward pressure to upper surface 105 presses trigger 15. When more repetitive use of trigger 15 is required, the user may easily move finger 300 to sloped outer front surface 118 of trigger attachment 100 and use a downward or pulling motion to press trigger 15. As shown in FIG. 20, upper surface 105 being sloped or slightly convex provides a shelf for fingertip 302 with faster transitioning to sloped outer front surface 118. In contrast, curved upper surface of FIG. 21 better matches the natural curvature of fingertip 302 for improved grip between fingertip 302 and upper surface 105.

Users of trigger attachment 100 benefit by reducing unwanted motion in the trigger range of motion 20. Other benefits of embodiments of trigger attachment 100 include improved comfort and ergonomics for actuating trigger 15. Depending on the embodiment, trigger attachment 100 may reduce the over travel 24, take-up 23, or both. For games where only one trigger 15 benefits from reduced trigger range of motion 20, trigger cover 200 may be used to provide the same reach and feel for right and left triggers 15. Alternately, trigger cover 200 may be used interchangeably with trigger attachment 100 when no reduction in trigger range of motion 20 is desired or necessary.

Although exemplary embodiments of the present invention have been described herein, the above description is merely illustrative. Further modification of the invention herein disclosed will occur to those skilled in the respective arts and all such modifications are deemed to be within the scope of the invention as defined by the appended claims.

I claim:

1. A trigger attachment for use with a game controller having a housing, a trigger extending through the housing with a finger contact surface and operable through a trigger range of motion between a zero position and an end position, and a button extending through the housing above the trigger and spaced from the trigger by a housing spacer, the trigger attachment comprising:
    an attachment body defining a recess with a receiving face shaped to mate with the finger contact surface of the trigger, a sloped outer front surface, a lower housing contact surface, and an upper contact surface extending transversely from a top margin of the sloped outer front surface at least 2.5 mm toward a lower margin of the housing spacer, wherein the upper contact surface provides an alternate surface to the sloped outer front surface for an user to press the trigger;
    wherein the attachment body is sized and shaped to be mounted on the trigger with the trigger partially received in the recess with the finger contact surface of the trigger against the receiving face of the attachment body; and
    wherein when mounted on the trigger, the lower housing contact surface is positioned to abut the housing when the trigger is pressed, thereby reducing the trigger range of motion by preventing the trigger from fully achieving the end position.

2. The trigger attachment of claim 1, wherein the upper contact surface slopes upward from the upper margin of the sloped outer front surface to the lower margin of the housing spacer.

3. The trigger attachment of claim 1, wherein the upper contact surface curves upward from the upper margin of the sloped outer front surface to the lower margin of the housing spacer.

4. The trigger attachment of claim 3, wherein the upper contact surface has a radius of curvature from 3 mm to 8 mm.

5. The trigger attachment of claim 1 further comprising an adhesive disposed on the receiving face of the trigger attachment.

6. The trigger attachment of claim 1, wherein the upper contact surface extends transversely from a top margin of the sloped outer front surface at least 3 mm toward a lower margin of the housing spacer.

7. The trigger attachment of claim 1, wherein the upper contact surface extends transversely from a top margin of the sloped outer front surface at least 4 mm toward a lower margin of the housing spacer.

\* \* \* \* \*